United States Patent
Satish et al.

(10) Patent No.: US 11,327,827 B1
(45) Date of Patent: May 10, 2022

(54) OPTIMIZING DISPLAY OF SUGGESTED ACTIONS IN A WORKBOOK

(71) Applicant: Splunk Inc., San Francisco, CA (US)

(72) Inventors: Sourabh Satish, Fremont, CA (US); David Wayman, San Francisco, CA (US); Glenn Gallien, San Francisco, CA (US); Akshay Dongaonkar, Oakland, CA (US)

(73) Assignee: Splunk Inc., San Francisco, CA (US)

( * ) Notice: Subject to any disclaimer, the term of this patent is extended or adjusted under 35 U.S.C. 154(b) by 382 days.

(21) Appl. No.: 16/429,043

(22) Filed: Jun. 2, 2019

(51) Int. Cl.
*G06F 11/00* (2006.01)
*G06F 11/07* (2006.01)
*G06F 9/451* (2018.01)
*G06Q 10/06* (2012.01)

(52) U.S. Cl.
CPC .......... *G06F 11/0793* (2013.01); *G06F 9/451* (2018.02); *G06F 11/0769* (2013.01); *G06Q 10/06316* (2013.01)

(58) Field of Classification Search
None
See application file for complete search history.

(56) References Cited

U.S. PATENT DOCUMENTS

| 10,587,642 | B1 * | 3/2020 | Herman-Saffar ... H04L 63/1416 |
| 10,862,905 | B2 * | 12/2020 | Zettel, II ............. H04L 63/1416 |
| 2007/0266138 | A1 * | 11/2007 | Spire .................... H04L 63/1416 709/223 |
| 2015/0215325 | A1 * | 7/2015 | Ogawa ................ H04L 63/1416 726/23 |
| 2015/0365438 | A1 * | 12/2015 | Carver ................ H04L 63/1416 726/1 |
| 2021/0248569 | A1 * | 8/2021 | Moyal ...................... G06N 5/02 |

OTHER PUBLICATIONS

U.S. Appl. No. 62/693,410: Moyal et al. (Year: 2018).*
Google Scholar/Patents—text refined (Year: 2021).*

* cited by examiner

Primary Examiner — Christopher S McCarthy
(74) Attorney, Agent, or Firm — Nicholson De Vos Webster & Elliott LLP

(57) ABSTRACT

An information technology (IT) operations platform is described that enables users to execute one or more executable actions from a set of executable actions presented in a prioritized order based on historical data. In response to identifying an occurrence of a type of incident in an IT environment, the IT operations platform generates a workbook based on a customizable workbook template. The customizable workbook template includes a plurality of tasks grouped into a plurality of phases for responding to occurrences of the type of incident, and each task of the plurality of tasks is associated with a respective set of suggested executable actions for completing the corresponding task. The IT operations platform then causes the display of a graphical user interface (GUI) including a representation of the workbook, including interface elements representing the respective set of suggested executable actions displayed in the prioritized order.

30 Claims, 8 Drawing Sheets

IT Operations Platform

Playbooks | Custom Lists

PLAYBOOKS LIST 202

| Name | Label v | Repo v | Category v | Status v |
|---|---|---|---|---|
| Playbook 1 | Successful Executions: 10 | Failed Executions 2 | Last Updated: Jan. 10, 2019<br>This playbook can be used to remediate virus-related incidents at endpoint devices. | events | community | IT ops | active |
| Playbook 2 | Successful Executions: 2 | Failed Executions 0 | Last Updated: Dec. 30, 2018<br>This playbook can be used to geo-locate IP addresses. | events | community | Security | inactive |
| Playbook 3 | Successful Executions: 50 | Failed Executions 5 | Last Updated: Nov. 10, 2018<br>This playbook can be used to quarantine endpoint devices. | events | community | Sample | inactive |
| Playbook 4 | Successful Executions: 20 | Failed Executions 0 | Last Updated: Aug. 8, 2018<br>This playbook can be used to remediate virus-related incidents at endpoint devices. | | private | Sample | active |
| Playbook 5 | Successful Executions: 0 | Failed Executions 0 | Last Updated: Jan. 20, 2019<br>This playbook can be used to restart servers experiencing issues. | campaign | community | | inactive |

< ① 2 3 4 5 >   Show 5 v

PLAYBOOKS MANAGEMENT INTERFACE 200

*FIG. 2*

MISSION CONTROL INTERFACE 600

IT Operations Platform     MISSION CONTROL     👤 admin events ID: 1053
∨ Possible malicious file detected    [HIGH ∨]   More ∧   Owner [Admin ∨]   Set Status [Open ∨]   Current Phase [Escalate to a... ∨]

Source ID: FCwlpPStrcgawefWn5aZb   Activity Start: April 23rd at 10:26 am   Created: April 23rd at 10:03 am   Opened:   Not Opened:   Playbooks Run: 1
Artifacts: 1   Activity End: April 23rd at 10:27 am   Updated: a minute ago   Resolved   Not Resolved   Actions Runs: 0 description:   Detected event

| Tasks | Activity | Guidance | | Timeline | HUD | Artifacts ∨ | Vault | JSON | Approvals | Reports | [EDIT] [AUDIT] [>ACTION] [>PLAYBOOK] [EXPORT] |

Task List

▶ Escalate to accountable system owners   Current ⊙

608 ⎫
    ⎬ 700b05436c1b80bb714265e4    2    0    0
    Most Recent IOC    IOC Count    Affected Users    Affected IPs ┌─ Identify accountable system owners assigned to Robert Jones ──────────────┐
│ ⊙ run query                                                                 │
│ ⊙ list oncalls                                                              │
│ ⊙ get oncall                                                                │
│ ⊙ get system attributes                                                     │
│ ⊙ get user attributes                                                       │
│ ⊙ get users                                                                 │
│ ⊙ ask question                                                              │
│ ⊙ track_active_directory_admin_users                                        │
└─────────────────────────────────────────────────────────────────────────────┘

Notify accountable system owners assigned to Robert Jones

PINNED ITEMS

| DATE | MESSAGE | DATA | BY |
|---|---|---|---|
| Apr 23 at 05:33 AM | IOC Types | url, hash | automation |

Widgets    Notes                 [MANAGE WIDGETS]

602 → (interface)
604 → (task section)
606 → (task details box)

FIG. 6

OPTIMIZING DISPLAY OF SUGGESTED ACTIONS IN A WORKBOOK

RELATED APPLICATIONS

Any and all applications for which a foreign or domestic priority claim is identified in the Application Data Sheet as filed with the present application are incorporated by reference under 37 CFR 1.57 and made a part of this specification.

FIELD

At least one embodiment of the present disclosure pertains to computing environment security, operational administration, and automation and, in particular, to optimizing the presentation of suggested executable actions for responding to occurrences of incidents within an information technology (IT) environment.

BACKGROUND

An increasing number of security threats and operational issues exist in modern IT environments. These threats and operational issues include, for example, viruses and malware that attack various types of computing devices, sophisticated cyberattacks that attempt to gather data and other information from cloud- or server-based infrastructures, software bugs and hardware failures associated with IT components, among a wide range of other events that can disrupt IT operations. Furthermore, a typical IT infrastructure managed by a business or other entity includes many different types of computing devices, applications, and services that are used to support operations, such as data storage, networking, web sites and application services, and the like. To protect complex IT infrastructures, system administrators typically employ a wide array of devices and applications including, for example, various antivirus, encryption, firewall, and other IT operations applications.

BRIEF DESCRIPTION OF DRAWINGS

Various embodiments in accordance with the present disclosure will be described with reference to the drawings, in which:

FIG. 2 illustrates an example interface used to manage digital playbooks associated with an IT operations platform according to some embodiments.

FIG. 6 illustrates an example of a "mission control" interface of an IT operations platform displaying information regarding an occurrence of an incident in an IT environment according to some embodiments.

DETAILED DESCRIPTION

Figure 1:
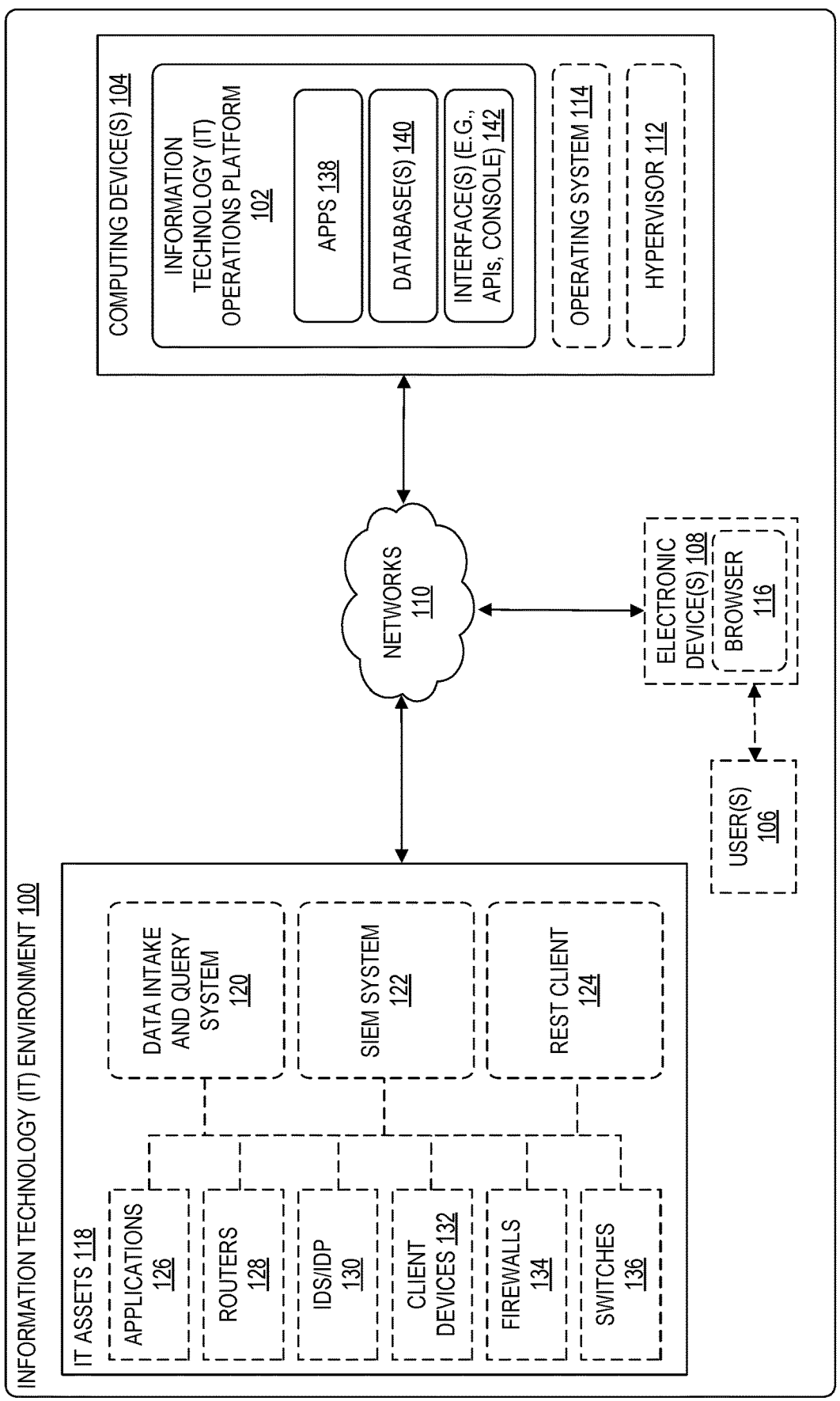
FIG. 1 is a block diagram illustrating an example networked computing environment including an information technology (IT) operations platform according to some embodiments.

Embodiments are described herein according to the following outline:

1.0. General Overview
2.0. Information Technology (IT) Operations Platform Overview
   2.1. Data Intake
   2.2. Actions
   2.3. Apps
   2.4. Assets
   2.5. Playbooks
      2.5.1. Playbook Management
      2.5.2. Playbook Creation and Configuration
      2.5.3. Playbook Execution
   2.6. Workbooks
3.0. Functional Overview
3.1. Optimizing Suggested Executable Actions 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. To reduce the size of the potentially vast amount of machine data that may be generated, many of these tools typically pre-process the data based on anticipated data analysis needs. For example, pre-specified data items may be extracted from the machine data and stored in a database to facilitate efficient retrieval and analysis of those data items at search time. However, the rest of the machine data typically is not saved and is instead discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although some of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, and so forth.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as by Internet Protocol (IP) address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

2.0. Information Technology (IT) Operations Platform Overview

As indicated above, the management of modern IT environments often involves managing a large number of devices and software operating within such environments. A system administrator of even a modestly-sized IT environment, for example, might be responsible for managing numerous servers, endpoint devices, firewalls, and various types of software products and services running on top of those devices. Systems such as the SPLUNK® ENTERPRISE system, as well as other various SIEM, security, and IT operations applications, provide ways to organize, analyze, diagnose, and provide intelligence related to these components of users' IT environments.

The management of IT environments often further includes responding to a wide variety of incidents that may occur over time and which may be indicated or derived from analysis of data generated by IT environment components, as described above. Such incidents can include security-related incidents (for example, viruses, network issues, etc.), IT component-related incidents (for example, hardware failures, software bugs, etc.), and any other events that potentially impact operation of an IT environment. These incidents can be flagged, and information related to the incidents may be provided to an administrator or other user to be analyzed for a possible solution. Once a possible solution is identified, the process for remediating such incidents can involve interacting with one or several components within the IT environment. In response to identifying a security-related issue involving an endpoint device, for example, a system administrator might use security software to quarantine the endpoint device, interact with a firewall to update network settings, among any number of other possible operations.

The ability to readily respond to incidents in an IT environment can be aided by using an IT operations platform, also sometimes referred to as an orchestration, automation, and response (OAR) platform, such as the SPLUNK® PHANTOM® system. An IT operations platform generally enables users to connect disparate collections of security and IT applications in users' IT environments and to automate tasks typically performed manually by system administrators and other users in response to identification of various types of IT-related incidents.

FIG. 1 is a block diagram illustrating an example networked computing environment including an IT operations platform according to some embodiments. In some embodiments, an IT operations platform 102 operates in a networked IT environment 100 and comprises one or more software components executed by one or more electronic computing devices 104. The computing devices 104 generally can be hosted at an on-premises or cloud-based computing environment, or a combination thereof, such that the IT operations platform 102 can be accessed by users 106 and used to interact with components of an organization's computing infrastructure. Users 106 using one or more electronic device(s) 108 (which may be part of or separate from the IT environment 100) can interact with the IT operations platform 102 via one or more networks 110. Networks 110 broadly represent one or more local area networks (LANs), wide area networks (WANs), cellular networks (e.g., Long-Term Evolution (LTE), High Speed Packet Access (HSPA), 3G, and other cellular technologies), and networks using any of wired, wireless, terrestrial microwave, or satellite links, and may include the public internet. Users 106 may interact with an IT operations platform 102 via one or more interfaces 142, such as through use of application programming interface (API) calls, via a console implemented as a website or application, etc.

In some embodiments, some or all the computing devices 104 and systems upon which an IT operations platform 102 operates may rely upon virtualization techniques. These virtualization technologies may include virtual machines (VMs) using a guest operating system 114 that operates using a hypervisor 112, where the hypervisor 112 itself may or may not further operate on top of an underlying host operating system. The virtualization technologies may additionally or alternatively include use of containers that may or may not operate in a VM, software that executes on computing device 104 hardware without an underlying hypervisor or other virtualization technology, or any other combination thereof.

In some embodiments, an IT operations platform 102 can be deployed as a virtual appliance at one or more computing devices 104 managed by an organization using the IT operations platform 102. A virtual appliance, for example, may comprise a VM image file that is pre-configured to run on a hypervisor 112 or directly on the hardware of a computing device 104 and that comprises a pre-configured operating system 114 upon which the IT operations platform 102 executes. In other embodiments, the IT operations platform 102 can be provided and installed using other types of standalone software installation packages or software package management systems. Depending on the implementation and user preference, an IT operations platform 102 optionally can be configured on a standalone server or in a clustered configuration across multiple separate computing devices 104. In other embodiments, an IT operations platform 102 can be hosted on computing devices 104 managed by an entity that is separate from the users 106 and provided to users 106 as a service (for example, as a service of a cloud-based service provider).

In some embodiments, a user initially configures an IT operations platform 102 using a virtual console screen or other interface of a VM hosting the IT operations platform 102, for example, to create and configure root and user accounts, configure network settings, and perform other possible configurations. Once a virtual appliance hosting an IT operations platform 102 is associated with an IP address and is reachable via a network 110, users 106 can access various interfaces of the IT operations platform 102, including a web-based console. For example, users 106 can use a web browser 116 or other application to navigate to the IP address or hostname associated with the IT operations platform 102 to access console interfaces used to interact with various aspects of the platform.

An IT environment 100 further includes any number of IT assets 118, for example, as part of a corporate network or other environment with which one or more users 106 are associated. In an embodiment, each of these IT assets 118 can serve as sources of incident data to an IT operations platform 102, an asset upon which actions can be performed by the IT operations platform 102, or both. The IT assets 118 can include various types of computing devices, software applications, and services including, but not limited to, a data intake and query system 120 (which itself can ingest and process machine data generated by other IT assets 118), a SIEM system 122, a REST client 124 that obtains and/or generates incident data based on the activity of other IT assets 118, software applications 126 (including operating systems, databases, web servers, etc.), routers 128, intrusion detection systems and intrusion prevention systems (IDS/IDP) 130, client devices 132 (for example, servers, desktop computers, laptops, tablets, etc.), firewalls 134, and switches 136. These IT assets 118 may execute upon any number separate computing device(s) and systems within the IT environment 100.

During operation, a data intake and query system 120, SIEM system 122, REST client 124, or other system components or combinations thereof, obtain operational, performance, and security data from other IT assets 118, analyze the data, and optionally identify potential IT-related incidents and send data indicating such incidents to the IT operations platform 102. Once a data intake and query system 120 identifies a possible security threat or other IT-related incident based on data ingested by the data intake and query system 120, for example, data representing the incident can be sent to the IT operations platform 102 (for example, formatted as JavaScript Object Notation (JSON) data or using other possible data formats). As described in more detail herein, the IT operations platform 102 obtains and analyzes such incident data to determine possible actions to perform to remediate or otherwise respond to such incidents. These actions can include default actions that can be initiated and performed within the IT environment 100 without interaction from an administrator or other user and can further include providing suggested actions to one or more users 106. Once the suggested actions are determined, for example, these actions can be presented in an administration console or other interface accessible to users 106. Based on the suggested actions, a user 106 can select one or more particular actions to be performed and the IT operations platform 102 can carry out the selected actions within the IT environment 100.

In some embodiments, to execute actions responsive to identified incidents, an IT operations platform 102 uses a unified security language to perform actions across a variety of hardware and software products, applications, and services. To execute a command specified using the unified language, for example, the IT operations platform 102 uses one or more apps 138 to translate the commands into the one or more processes or languages necessary to implement the action at one or more particular IT assets 118. For example, a user 106 might provide input requesting the IT operations platform 102 to remove an identified malicious process from multiple computing systems in the IT environment 100, where two or more of the computing systems are associated with different software configurations (for example, different operation systems or operating system versions). Accordingly, the IT operations platform 102 translates the command from the administrator into the necessary processes to remove each instance of the malicious process on the varying computing systems.

In some embodiments, an IT operations platform 102 enables users to automate actions or series of actions by creating digital "playbooks" that can be executed by the IT operations platform 102. At a high level, a playbook is a customizable computer program that can be executed by an IT operations platform 102 to automate a wide variety of possible operations related to an IT environment 100. These operations—such as quarantining devices, modifying firewall settings, restarting servers, and so forth—are typically performed by various security products by abstracting product capabilities using an integrated "app model." Additional details related to operation of the IT operations platform 102 and use of digital playbooks are provided elsewhere herein.

2.1. Data Intake

The operation of an IT operations platform 102 generally begins with the ingestion of data related to various types of incidents involving one or more IT assets 118 of an IT environment 100. In one embodiment, users 106 configure an IT operations platform 102 to obtain, or "ingest," data from one or more defined data sources, where such data sources can be any type of computing device, application, or service that supplies information that users may want to store or act upon. As indicated above, examples of data sources include, but are not limited to, a data intake and query system 120 such as the SPLUNK® ENTERPRISE system, a SIEM system 122, a REST client 124, applications 126, routers 128, intrusion detection systems (IDS)/intrusion prevention systems (IDP) systems 130, client devices 132, firewalls 134, switches 136, or any other source of data identifying potential incidents in an IT environment. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In an embodiment, data ingested from configured data sources is represented in the IT operations platform 102 by "containers." A container is a structured representation of an incident or other type of data ingested from a data source and that can be used throughout the IT operations platform 102. In some embodiments, an IT operations platform 102 can be configured to create and recognize different types of containers depending on the corresponding type of data ingested, such as "incident containers" for IT-related incidents, or "security event containers" for security-related incidents, and so forth. A container can further include any number of "artifacts," where each artifact represents an item of data associated with the container. For example, a container used to represent data ingested from an anti-virus service and representing security-related incidents may include artifacts indicating a name of the virus, an associated hash value, a file path on the infected endpoint, and so forth.

In an embodiment, the IT operations platform 102 stores various data related to its operation, including container data created based on data ingested from IT assets, playbook data, user account settings, configuration data, and so forth, in one or more database(s) 140. These database(s) 140 may operate on a same computer system as the IT operations platform 102 or at one or more separate database instances.

In some embodiments, an IT operations platform 102 enables users to configure an instance of the platform to support multi-tenancy. A multi-tenant configuration, for example, can enable users of a security team to manage assets associated with multiple independent third-party organizations for which the security team is responsible while maintaining data separation and security among the configured assets and data of each organization. Users and user teams can thus use this feature to perform incident response for multiple third-party organizations on one instance of the IT operations platform 102 and using only a single login and permissions configuration.

In an embodiment, users can create custom data sources using a REST client 124. For example, a REST client can be configured to monitor one or more IT assets 118 for incidents and use APIs 142 provided by the IT operations platform 102 to create, update, and remove data from an IT operations platform 102 corresponding to the incidents.

2.2. Actions

In an embodiment, the IT operations platform 102 defines many different types of "actions," which are high-level, vendor- and product-agnostic primitives that can be used throughout the IT operations platform 102. At a high level, actions represent simple and user-friendly verbs that are used to execute actions in playbooks and manually through other user interfaces of the IT operations platform 102. In general, a same action defined by the IT operations platform 102 can be carried out on assets associated with different vendors and/or configurations, where the translation of an action for use at a particular asset is performed by various "apps" of the platform, as described below. Examples of actions that may be defined by an IT operations platform 102 include, for example, "get process dump," "block IP address," "suspend VM," "terminate process," etc.

2.3. Apps

In an embodiment, an IT operations platform 102 enables connectivity with various IT assets 118, including those from various third-party IT and security technologies, and the ability to execute actions at those assets via "apps" 138. In general, an app 138 represents program code that provides an abstraction layer (e.g., via a library, API, or other interface) to one or more of hundreds of possible IT and security-related products and services, and which exposes lists of actions that are supported by those products and services. Each app 138 may also define which types of assets that the app can operate on.

As one example, an IT operations platform 102 may be configured with an app 138 that enables the platform to communicate with a VM product provided by a third-party vendor. In this example, the app for the VM product enables the platform 102 to take actions relative to VM instances within a user's IT environment, including starting and stopping the VMs, taking VM snapshots, analyzing snapshots, and so forth. In order for the app to communicate with individual instances, the app 138 can be configured with login credentials, hostname or IP address, and so forth, for each instance with which communication is desired. Other apps 138 may be available for VM products from other third-party vendors, where those apps are configured to translate some or all of the same actions that are available with respect to the first type of VM product. In general, apps 138 can enable interaction with virtually any type of IT asset 118 in an IT environment and can be added and updated over time to support new types of assets.

2.4. Assets

In an embodiment, IT assets 118 are instances of physical or virtual components within an organization with which an IT operations platform 102 communicates (for example, via apps as described above). Examples of IT assets 118 include, but are not limited to, servers, endpoint devices, routers, and firewalls. In the context of an IT operations platform 102, an IT asset 118 is represented by data identifying the asset, including information used to communicate with the device or service (for example, an IP address, automation service account, username, password, and so forth). In an embodiment, one or more IT assets 118 can be configured as a source of incident information that is ingested by an IT operations platform 102. The types of IT assets 118 that can be configured in the IT operations platform 102 may be determined in some cases based on what apps 138 are installed, as described above. In some embodiments, automated actions can be configured with respect to various IT assets 118 using playbooks, described in more detail elsewhere herein.

2.5. Playbooks

In some embodiments, the operation of an IT operations platform 102 includes the ability to execute customizable playbooks. At a high level, a playbook comprises computer program code and possibly other data that can be executed by an IT operations platform 102 to carry out an automated set of actions. In one embodiment, a playbook is comprised of one or more functions or codeblocks, where each codeblock contains program code that performs defined functionality when the codeblock is encountered during execution of the playbook of which it is a part. For example, a first codeblock may implement an action that is performed relative to one or more IT assets 118, another codeblock might filter data generated by the first codeblock in some manner, and so forth. A playbook is further associated with a control flow that defines an order in which the codeblocks of the playbook are executed, where a control flow may vary at each execution depending on particular input conditions.

The IT operations platform 102 described herein provides graphical user interfaces (GUIs) including a visual playbook editor that allows users to visually create and modify playbooks. Using a visual playbook editor GUI, for example, users can codify a playbook by creating and manipulating a displayed graph including nodes and edges, where each of the nodes in the graph represents a codeblock that performs one or more defined operations during execution of the playbook, and where the edges represent the control flow among the playbook's codeblocks. In this manner, users can craft playbooks that perform complex sequences of operations without having to write some or any of the underlying code. The visual playbook editor interfaces further enable users to supplement or modify the automatically generated code by editing the code associated with a visually-designed playbook, as desired.

2.2.1. Playbooks Management

In an embodiment, an IT operations platform 102 provides one or more playbook management interfaces that enable users to locate and organize playbooks associated with a user's account. A playbook management interface, for example, can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is kept, a status of the playbook, and so forth.

FIG. 2 illustrates an example playbook management interface according to some embodiments. As shown in FIG. 2, the playbook management interface 200 includes a playbook list 202. As indicated above, a playbook list 202 includes several columns indicating information about each playbook including, for example, a name of the playbook, one or more labels associated with each playbook, a repository at which the playbook is kept, a category associated with each playbook, and a status of the playbook. In an embodiment, a user can also use interface elements 204 to sort the list of displayed playbooks, refresh the playbook list, download an exported copy of one or more playbooks, or create a new playbook, among other possible operations. In an embodiment, a user can also provide input selecting a playbook to view in the visual playbook editor so that the user can modify the selected playbook, if desired.

2.5.2 Playbook Creation and Configuration

In an embodiment, users can create a new digital playbook starting from a playbook management interface, as described in reference to FIG. 2, or using another interface provided by the IT operations platform 102. Using the playbook management interface 200, for example, a user can select the "create new playbook" interface element from interface elements 204. Once a user has provided input requesting the creation of a new playbook, the IT operations platform 102 displays a visual playbook editor interface including a graphical canvas on which users can add nodes representing operations to be performed during execution of the playbook, where the operations are implemented by associated source code that can be automatically generated by the visual playbook editor, and connections or edges among the nodes defining an order in which the represented operations are performed upon execution.

Figure 3:
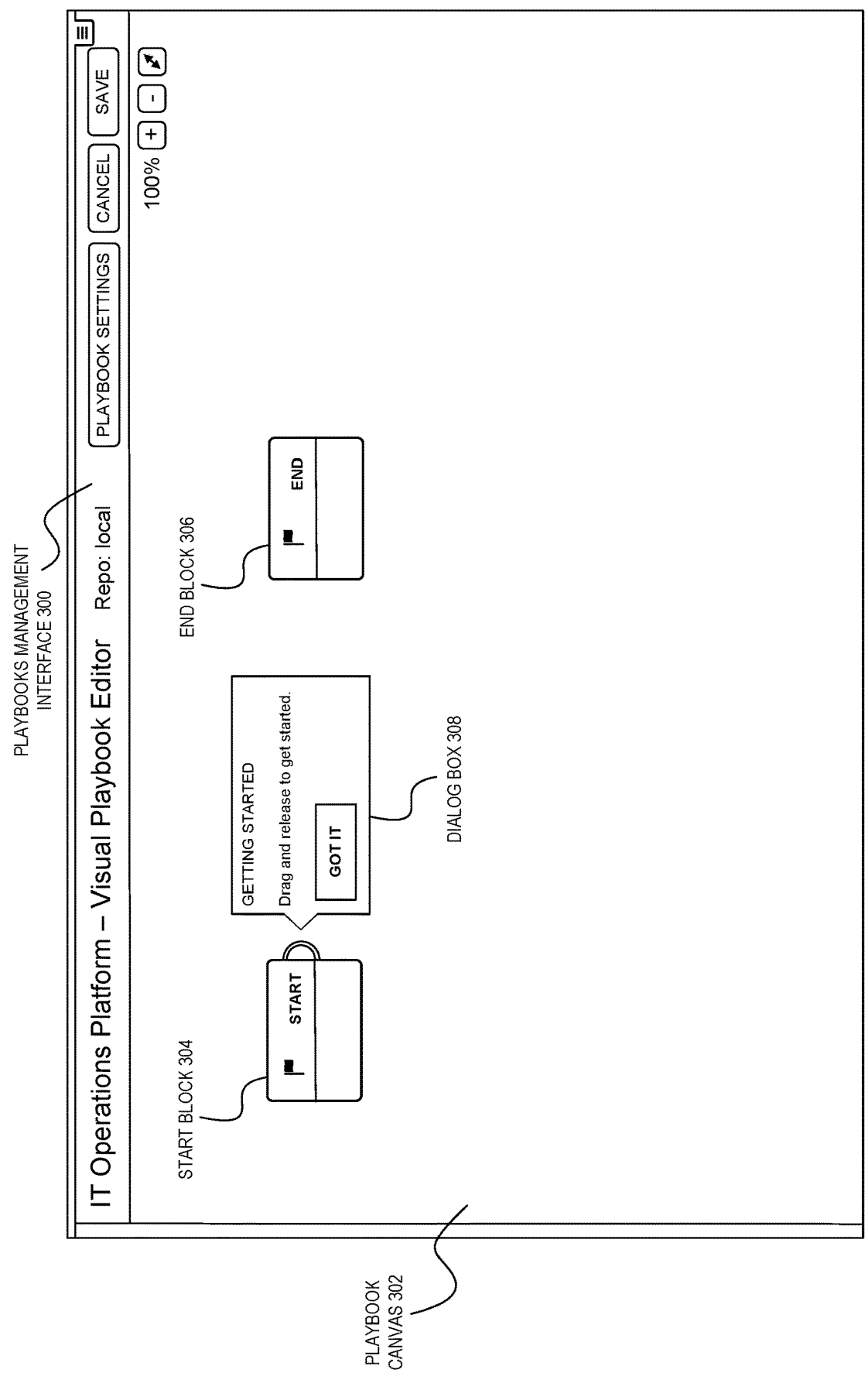
FIG. 3 illustrates an example visual playbook editor interface used to create a digital playbook according to some embodiments.

FIG. 3 illustrates a visual playbook editor canvas that can be used to visually design a playbook. As illustrated in FIG. 3, a visual playbook editor interface 300 includes a playbook canvas 302 initially including two nodes corresponding to a start block 304 and an end block 306, respectively, where those nodes represent a start and end point for execution of the playbook being designed. In the illustrated example, the visual playbook editor interface 300 further displays an example dialog box 308 instructing a user to select the start block 304 and to create an edge or connection originating from the start block 304 to add a new block to the playbook. As described in more detail below, the visual playbook editor interface 300 enables users to add various types of blocks to a playbook including, for example, playbook blocks, decision blocks, filter blocks, action blocks, format blocks, prompt blocks, task blocks, and API blocks.

In an embodiment, one type of block that can be added to a playbook is an action block. Once an action block is added to a playbook, the visual playbook editor interface can guide the user in selecting an action to be performed when the action block is encountered during execution of the playbook. The action block can optionally be further configured using various items of data accessible to the action block including, for example, data stored as part of a container and associated artifacts as well as other output variables generated by other playbook blocks. For example, if a user adds an action block that performs the operation of geolocating an IP address, a user may configure the action block to use an IP address corresponding to a selected artifact of a container that initiated the playbook's execution, or based on an IP address obtained by an upstream block using other processes.

In an embodiment, another type of block that a user can add to a playbook is a prompt block. A prompt block is generally used to add user interaction to a playbook by causing information to be requested from one or more users at a particular point during execution of the playbook. The information requested and provided by a user can be used by other downstream blocks of the playbook. For example, a playbook might include an action block that detects the presence of potentially malicious IP addresses, a serially-connected prompt block that presents information to a user about the detected potentially malicious IP address and requests a yes/no response from the user indicating whether the IP address should be blocked, followed by another serially-connected action block that either blocks the IP address at a firewall or not depending on the input received from a user in response to the prompt block.

In an embodiment, a prompt block is associated with various properties that can be configured by a user using a visual playbook editor including, for example, configurations indicating a prompt approver, a required response time, a message prompt, and a response type. The assignment of a prompt approver indicates an individual user or user role (e.g., administrator, engineer, manager) that is to receive the prompt to be acted upon during execution of the corresponding playbook. A required response time indicates an amount of time that an assigned approver or set of approvers have to complete the prompt, for example, by accessing the prompt and providing any requested information and/or performing actions specified by the prompt. A message prompt is information that is displayed to a user when the user accesses an assigned prompt (for example, a message prompt can be presented as part of a GUI interface element displayed to a user accessing an assigned prompt). A response type indicates a type of acceptable response that can be provided by a user to successfully complete the prompt (for example, ayes/no response, a numerical value response, a text-based response, a response from an enumerated list of options, etc.).

In some embodiments, a user accesses a prompt that has been generated for the user during execution of a playbook via a notification presented in a "mission control" or other type of interface of the IT operations platform 102. In response to a user accessing an assigned prompt (for example, by providing input selecting a notification indicating the existence of the prompt), the IT operations platform 102 causes display of an interface element that includes a message indicating what information is being requested from the user. A user assigned a prompt can either complete the prompt (that is, access the prompt and provide any requested data), delegate the prompt to a different user, or allow the deadline for responding to the prompt to time out. A prompt is successfully completed when either the designated user, or a user to whom the prompt is delegated, completes the prompt. If a prompt is assigned to a group of users, a prompt can be successfully completed when either at least one user of the group completes the prompt, or when all users of the group complete the prompt, depending on how the prompt is configured.

In an embodiment, yet another type of function block that can be added to a playbook is a task block. A task block is generally configured to send a message to a user or group of users to be acknowledged by the users. A task block can be further configured by specifying an approver (that is, a user or user role to whom the task is sent), a response deadline (for example, expressed in minutes from the time at which the task is generated), a message to be displayed to the user(s), among other possible configurations.

In an embodiment, yet another type of block that can be added to playbooks in a visual playbook editor is a decision block. A decision block generally can be used to control program flow associated with the playbook. For example, during execution of a playbook, a decision block can be used to determine whether the execution flow proceeds next to a block A or to a block B (or block C, and so forth) depending on the outcome of one or more logical conditions defined by the decision block. These logical conditions, for example, can be based on comparisons involving artifact data, container properties, date functions, action results, among other possible types of input data. The use of a decision block in a playbook, for example, is conceptually similar to an if-then conditional statement found in high-level programming languages.

In an embodiment, yet another type of block that can be included in a playbook is an API block. An API block can be used, for example, to set various parameters associated with an incident container upon which the playbook is executing or to interact with the IT operations platform 102 in other ways supported by an associated API. For example, an API block can be used to set a severity level associated with an incident container, to indicate that the incident container is resolved, to associate a label with the incident container, add a comment to the container, among other possible operations.

In an embodiment, the creation of a graph representing a playbook includes the creation of connections between function blocks, where the connections are represented by edges that visually connect the nodes of the graph representing the collection of function blocks. These connections among the playbook blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

In an embodiment, users can create connections that link function blocks of a playbook in parallel. For example, a user can create a connection that links the output of a function block A to the input of a function block B and separately to the input of a function block C. In this example, the IT operations platform 102 can execute the operations defined by function blocks B and C in parallel, although the exact ordering of the execution may not be guaranteed. For some playbooks, the execution of two or more function blocks in parallel may provide a performance benefit compared to executing the function blocks serially.

In an embodiment, the visual representation of a playbook in a visual playbook editor, comprising a collection of nodes and edges, can be modified over time. Users can provide input via the visual playbook editor interface, for example, to rearrange the location of and connection between nodes in the graph and the visual playbook editor can route existing connections among the nodes accordingly such that an easily understandable visual representation is provided. In some embodiments, multiple nodes can be selected and moved around the canvas as a group.

2.5.3. Playbook Execution

Once a user has codified a playbook using a visual playbook editor or other interface, the playbook can be saved (for example, in a database 140 and in association with one or more user accounts) and run by the IT operations platform 102. As illustrated in the example playbooks above, a playbook includes a "start" block that is associated with source code that begins execution of the playbook. More particularly, the IT operations platform 102 executes the function represented by the start block for a playbook with container context comprising data about the incident upon which the playbook is executed, where the container context may be derived from input data from one or more configured data sources. A playbook can be executed manually, for example, in response to a user providing input requesting execution of the playbook, or playbooks can be executed automatically in response to the IT operations platform 102 obtaining input events matching certain criteria. In embodiments where the source code associated with a playbook is based on an interpreted programming language (for example, such as the Python programming language), the IT operations platform 102 can execute the source code represented by the playbook using an interpreter and without compiling the source code into compiled code. In other examples, the source code associated with a playbook can first be compiled into byte code or machine code and executed by the IT operations platform 102.

2.6. Workbooks

Some IT operations platforms, such as the SPLUNK® PHANTOM® platform, include the ability for users to create, customize, and use "workbooks." At a high level, a workbook enables users to codify an organization's standard operating procedures (SOPs) and other defined processes for responding to incidents (e.g., security threats, operational issues, etc.) within an IT environment into reusable templates. In some embodiments, a workbook is comprised of one or more user-defined phases (e.g., detection, analysis, containment, eradication, recovery, etc., in the context of a security investigation), where each phase includes one or more user-defined tasks to be performed by assigned analysts or other users. A workbook in this way defines an overall procedure that helps efficiently guide users of an IT operations platform through the process of responding to, documenting, and reporting incidents when they occur. Different workbook templates can be defined for responding to different types of incidents—for example, one workbook template might be created to help analysts investigate and respond to computer security incidents, another workbook template can be created to help analysts recover from and report significant hardware failures, and so forth. In some examples, workbook templates can be created to help analysts carry out various industry-wide SOPs (e.g., the NIST-800-61 standard for responding to computer security incidents).

In some embodiments, each task defined as part of a workbook template can be optionally associated with one or more automated actions or playbooks that can be executed by the IT operations platform 102 to help to carry out the task. For example, if a workbook includes a task of obtaining a particular log file at one or more endpoint devices associated with an incident, that task can be associated with an automated action or playbook for obtaining the relevant log files without additional manual user involvement. A user may specify a set of one or more executable actions, playbooks, or a combination thereof, in association with some or all of a workbook's tasks as part of the workbook template configuration process. In some embodiments, the IT operations platform 102 can additionally or alternatively automatically associate actions and playbooks with particular tasks, for example, by matching tasks to possible actions/playbooks based on an analysis of the text or other attributes associated with phase/task definitions.

In some embodiments, an IT operations platform 102 includes various GUIs that enable users to interact with workbooks. For example, in response to the IT operations platform 102 identifying an occurrence of a particular type of incident, the IT operations platform 102 may instantiate a new workbook based on a previously defined workbook template associated with that type of incident (e.g., if a malware attack is identified, the IT operations platform 102 can create a new workbook based on a computer security incident workbook template). Once a new workbook is created, analysts can use these interfaces to complete assigned tasks and to view the workbook's progress. Users can perform assigned workbook tasks, for example, either by manually performing the tasks or by selecting one or more automated actions or playbooks associated with the task. Icons or other graphical elements representing the automated actions and playbooks associated with the various workbook tasks can be graphically displayed, for example, such that a user can execute associated actions/playbooks simply by selecting a corresponding interface element in a workbook GUI.

In some embodiments, an IT operations platform 102 further optimizes the presentation of executable actions and playbooks displayed in connection with workbook tasks. For example, instead of displaying the actions and playbooks associated with workbook tasks in an arbitrary order, the IT operations platform 102 can monitor and log the efficacy of each action and playbook over time and use such data to determine a prioritized order in which to display the actions/playbooks in a workbook (or determine whether to display particular actions or playbooks at all). For example, when an action associated with a task is executed, the IT operations platform 102 can monitor the action's execution and determine whether the action executed successfully (e.g., if an action is configured to terminate a process running on an endpoint device, the IT operations platform 102 can determine whether the action was actually able to successfully connect to the endpoint device and terminate the process). This information can be collected over time and used, for example, to display actions/playbooks associated with various tasks in an order that reflects how successful each action/playbook historically has been in completing the task so that analysts can be guided to those actions/playbooks most likely to successfully complete a task.

Figure 4:
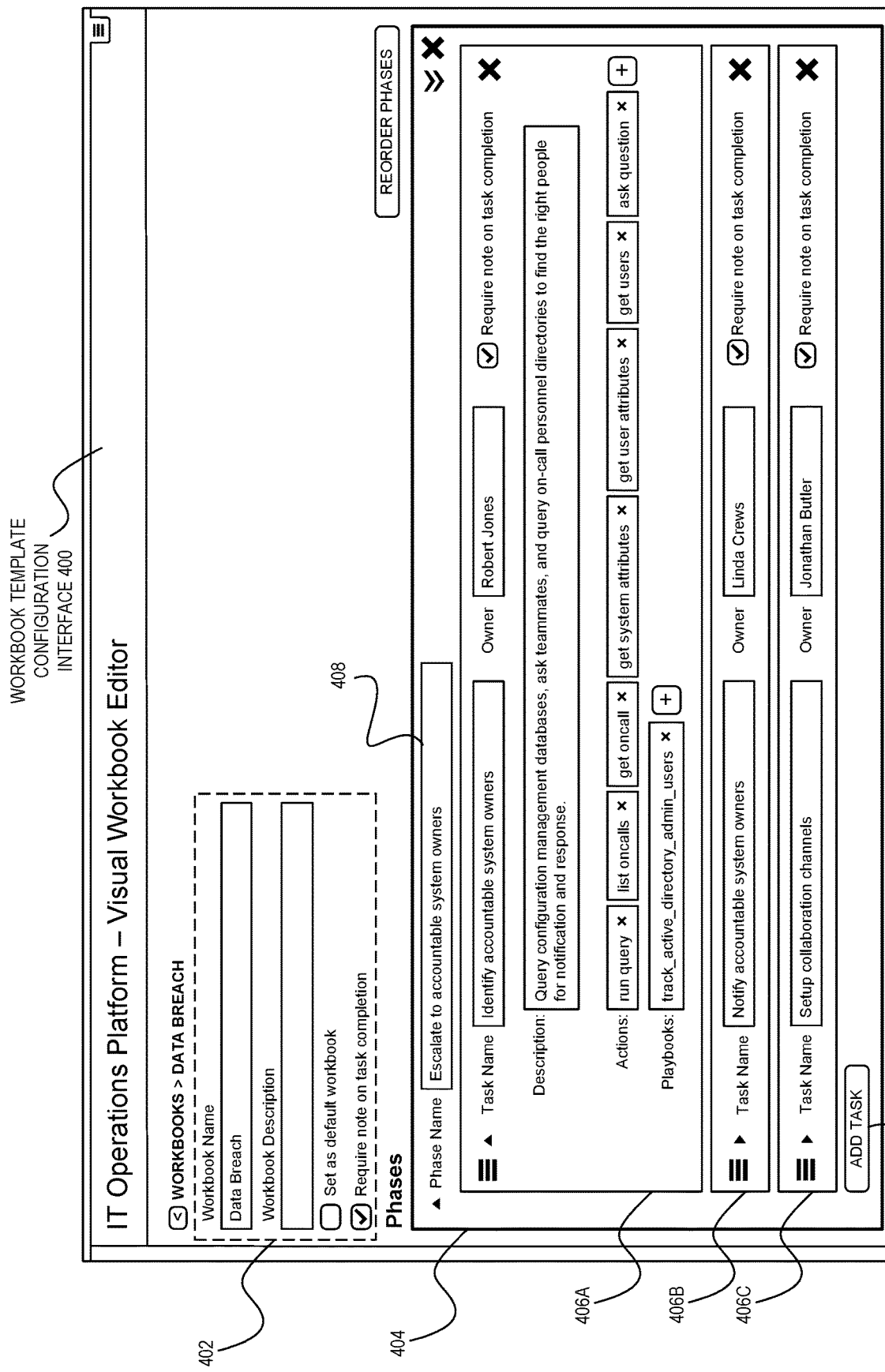
FIG. 4 illustrates an example workbook template configuration interface used to create a workbook according to some embodiments.

As indicated above, an IT operations platform 102 may include various GUIs that can be used to define workbook templates and to interact with workbook instances. FIG. 4 illustrates an example workbook template configuration interface used to create a workbook template according to some embodiments. As illustrated in FIG. 4, a workbook template configuration interface 400 includes interface elements for specifying information about a workbook template generally, and additional interface elements used to define the phases and tasks associated with the workbook.

In some embodiments, the workbook template configuration interface 400 includes a set of workbook information options 402, including fields for entry of a workbook name and workbook description, an interface element that can be used to set the current workbook as a default workbook, and an interface element that can be used to designate whether users are required to create a note upon completion of workbook tasks. In some embodiments, the workbook template configuration interface 400 further includes a phases definition panel 404. The example shown in FIG. 4 illustrates the definition of a single phase; however, a workbook template generally can include any number of separate phases as desired by the user. As illustrated in FIG. 4, the phases definition panel 404 include a field 408 for entry of a phase name and an add task button 410 used to add tasks to the phase. In FIG. 4, an example "Data Breach" workbook template includes a phase named "Escalate to accountable system owners." The phase named "Escalate to accountable system owners" includes three tasks: a task 406A named "Identify accountable system owners," a task 406B named "Notify accountable system owners," and a task 406C named "Setup collaboration channels." Each of the tasks 406A-406C includes fields for the task name and the owner (e.g., a user who can be designated as being responsible for the associated task), and a selector button to designate that a notification should be sent upon completion of the task. In response to selecting a specific task within a phase, the workbook editor displays additional options for the corresponding task. As illustrated in FIG. 4, selected task 406A includes a field for entry of text for a description of the task, in addition to options to add or remove executable actions and playbooks. The set of executable actions associated with task 406A includes the track_active_directory_admin_users playbook, as well as individual actions, including run query, list oncalls, get oncall, get system attributes, get user attributes, get users, and ask question.

Figure 5:
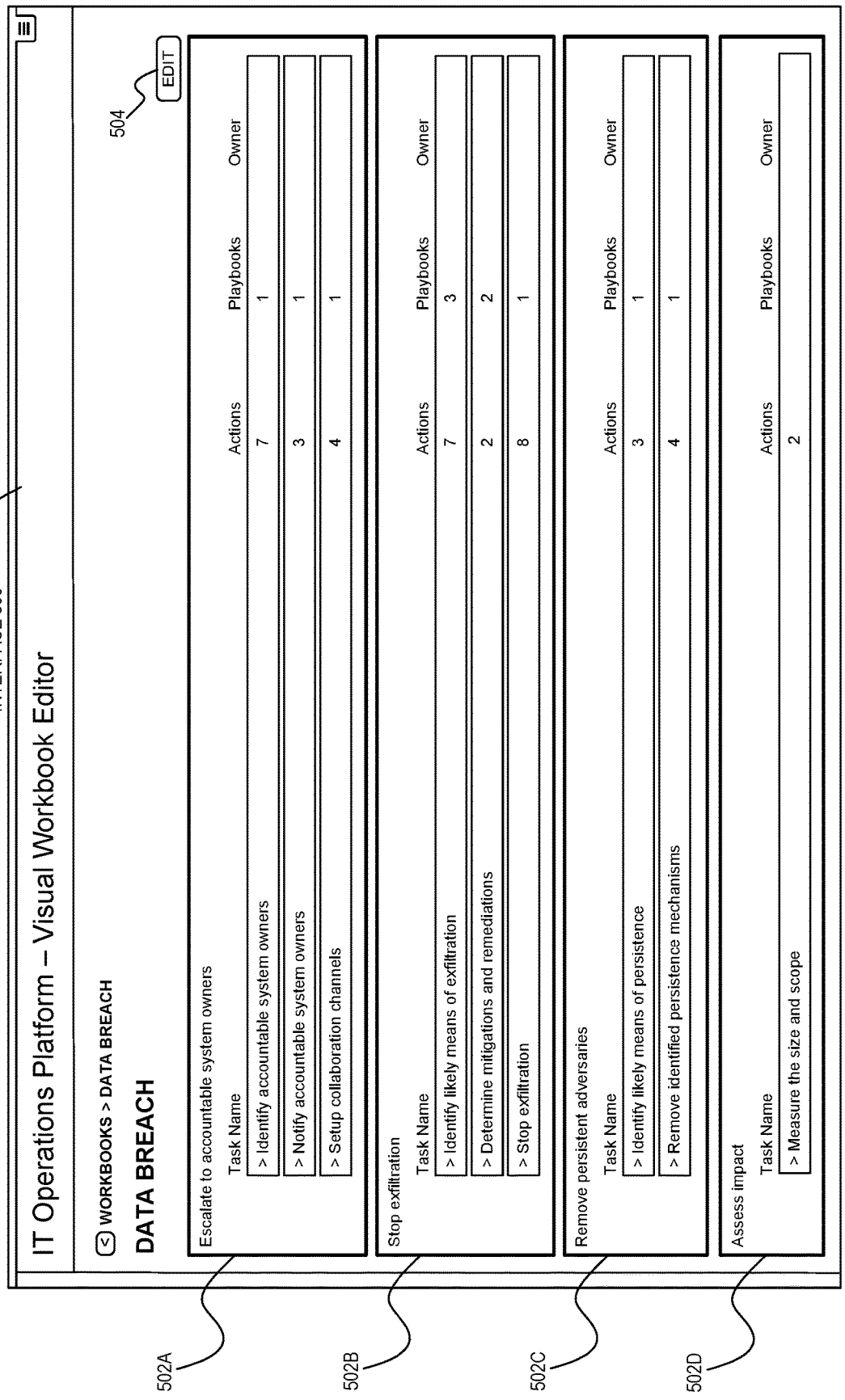
FIG. 5 illustrates an example workbook template review interface displaying information about a defined workbook template according to some embodiments.

FIG. 5 illustrates an example workbook template review interface displaying information related to a defined workbook template according to some embodiments. For example, as illustrated in the workbook template review interface 500 shown in FIG. 5, the phases of a created "Data Breach" workbook template include: a phase 502A labeled "Escalate to accountable system owners," a phase 502B labeled "Stop the exfiltration," a phase 502C labeled "Remove persistent adversaries," and a phase 502D labeled "Assess impact." Additional phases not pictured can include, for example, phases labeled "Report to appropriate stakeholders" and "Prevent future breaches." As illustrated in FIG. 5, the tasks associated with the phase 502B include: "Identify likely means of exfiltration," "Determine mitigations and remediations," and "Stop exfiltration"; the tasks associated with phase 502C include: "Identify likely means of persistence" and "Removed identified persistence mechanisms"; and the task for phase 502D include: "Measure the size and scope." The workbook template review interface 500 further displays, for each task, an indication of a number of actions and playbooks associated with the task, as well as an owner of the task, if any. A user can select an edit button 504 to further configure the workbook template, if desired.

3.0. Functional Overview

IT operations platforms, such as the IT operations platform 102 described herein, can be used for a variety of orchestration, automation, and response tasks related to IT environments. One way in which such a platform can be used is using workbooks to respond to occurrences of incidents identified in an IT environment, as described above in Section 2.6. According to embodiments described herein, an IT operations platform 102 further improves the efficiency of using such workbooks by providing a suggested set of executable actions associated with some or all of the tasks associated with a workbook. The suggested set of executable actions can include user-specified actions, actions automatically identified by the IT operations platform 102, or combinations thereof. In some embodiments, the IT operations platform 102 can further optimize display of the suggested set of executable actions by evaluating historical data reflecting previous executions of the executable actions to determine a prioritized order for the executable actions.

3.1. Optimizing Suggested Executable Actions

FIG. 6 illustrates an example of a "mission control" interface of an IT operations platform (e.g., IT operations platform 102) displaying information related to an occurrence of an incident in an IT environment according to some embodiments. In some embodiments, the mission control interface 600 displays one or more executable actions for responding to the incident as part of a workbook that is generated based on the identified incident. The mission control interface 600 shown in FIG. 6 includes, for example, an event information panel 602, a tasks panel 604, a set of suggested executable actions 606 associated with a particular task, and a head-up display (HUD) panel 608.

The event information panel 602 displays information regarding an incident (or event) managed by the IT operations platform 102. For example, the IT operations platform 102 may receive data from another system or application (e.g., a data intake and query system, a security application, etc.) or directly detects information identifying the occurrence of incident in an IT environment. As illustrated in FIG. 6, the event information panel 602 includes an event identifier, an incident type (e.g. "Possible malicious file detected"), an incident severity, information indicating an administrator for the incident, a status of the incident, a current phase of the incident, among other information.

In response to identifying the occurrence of the incident, the IT operations platform 102 generates a workbook from a customizable workbook template based on the incident type of the incident. In some embodiments, the IT operations platform 102 populates a task panel 604 with contents from the generated workbook. For example, the incident type associated with the incident displayed in FIG. 6 triggers the "Data Breach" workbook, for example, as shown being configured in FIGS. 4-5. As illustrated in FIG. 6, the tasks panel 604 includes multiple tasks grouped into a phase for responding to the occurrence of the incident. In this example, the tasks panel 604 includes an "Escalate to accountable system owners" phase, including at least the two displayed tasks: "Identify accountable system owners" and "Notify accountable system owners." In some embodiments, the set of suggested executable actions 606 includes executable actions and/or playbooks that can be executed to help an analyst complete the associated task, or some portion of the task. As illustrated in FIG. 6, the set of suggested executable actions 606 for the "Identify accountable system owners" task corresponds to the executable actions and playbook established in the workbook template configuration interface 400 of FIG. 4, and may also include other automatically identified actions/playbooks.

In some embodiments, the IT operations platform 102 displays the set of suggested executable actions 606 in the mission control interface 600 in an order based on historical data indicating whether past executions of each suggested executable action were successful or failed (or some indication of success between total success or failure). As illustrated in FIG. 6, the IT operations platform 102 displays the executable actions and playbooks in separate ordered lists (for example, the playbook labeled "track_active_directory_admin_users" is displayed separately from the other tasks). In other embodiments, the IT operations platform 102 displays the executable actions and playbooks in a single ordered list.

As indicated above, the set of suggested executable actions 606 can include user-specified executable actions, automatically identified executable actions, or combinations thereof. User-specified executable actions, for example, can include executable actions assigned to a specific task by an administrator or user in a customizable workbook template. In some embodiments, the IT operations platform 102 further modifies a customizable workbook template or a generated workbook to include automatically identified executable actions. In one embodiment, the IT operations platform 102 identifies a description of a particular phase/task and accesses a data structure to identify at least one executable action from a plurality of executable actions. For example, the IT operations platform 102 identifies executable actions correlated to the text description or name of the particular phase/task (e.g., using a word matching process).

In some embodiments, the IT operations platform 102 receives, via the mission control interface 600, a selection of a suggested executable action from the set of suggested executable actions associated with a particular task. For example, for the current task in the tasks panel 604, "Identify accountable system owners," the IT operations platform 102 receives a selection of one of the executable actions or the playlist in the set of suggested executable actions 606. In one embodiment, the selection of one of the set of suggested executable actions 606 causes the IT operations platform 102 to display an interface related to execution of the selected executable action (e.g., as an overlay over the mission control interface 600, as a new interface, as a modification to the mission control interface 600, etc.).

In some embodiments, the IT operations platform 102 generates log data associated with the execution of an executable action. In one embodiment, the log data includes an indication of whether the execution of the selected executable action was successful. As one example, the IT operations platform 102 may characterize the outcome of an executable action to "query a threat database" as a success when, in response to a request to execute the action, the IT operations platform 102 is able to connect to the threat database, query the threat database, and receive query results. As another example, the IT operations platform 102 may characterize the outcome of an executable action to "remove malicious processes" as a success when, in response to receiving a request to execute the action, the IT operations platform 102 determines that it was able to successfully kill the process on the relevant endpoint devices. Where the IT operations platform 102 determines that an executable action or playbook did not complete successfully, or a response is not received, the IT operations platforms 102 characterizes the outcome of the executable action or playbook as a failure.

In some embodiments, the IT operations platform 102 periodically evaluates the log data to determine a success rate of a suggested executable action as compared to other suggested executable actions. For example, the IT operations platform 102 can compare the success rate across all or a subset of suggested executable actions and identify the suggested executable actions with a higher likelihood of success for determining an order for future occurrences of incidents. In one embodiment, the IT operations platform 102 evaluates the log data for actions performed by a plurality of users in determining a success rate of a suggested executable action as compared to other suggested executable actions.

In some embodiments, where the selected executable action is not from the set of suggested executable actions, the IT operations platform 102 evaluates the log data to determine whether to include the executable action as an automatically identified action in the set of suggested executable actions associated with a particular task in the customizable workbook template. In some embodiments, the IT operations platform 102 adds the executable action to the set of suggested executable actions in response to the executable action being selected for the task a minimum predefined number of times, the executable action producing a successful result a minimum predefined number of times, the executable action being selected by a minimum predefined number of users, and/or a user input. For example, the IT operations platform 102 queries an administrator for approval of adding the automatically identified action to the set of suggested executable actions. In one embodiment, the IT operations platform 102 generates and sends a notification to an administrator indicating the addition of a executable action to the set of suggested executable actions.

In some embodiments, the set of suggested executable actions 606 is a subset of the total number of the executable actions associated with a particular task. For example, the set of suggested executable actions 606 can be a random selection from the total number of the executable actions associated with a particular task, the executable actions associated with a particular task having the highest success rate, or another ordering. In some embodiments, when a new executable action is added to the particular task (e.g., either by a user or the IT operations platform 102), and the set of suggested executable actions 606 is a subset of the total number of the executable actions associated with a particular task, the IT operations platform 102 causes a preexisting executable action to be removed from the set of suggested executable actions 606.

In some embodiments, the IT operations platform 102 observes the execution of the executable actions and playbooks and statistically scores each of the executable actions and playbooks based on a plurality of factors. For example, the IT operations platforms 102 statistically scores each of the executable actions and playbooks based on what executable actions and playbooks are executed, whether the execution results in a success or a failure, the frequency of use of an executable action or playbook, the recency of use of an executable action or playbook, the amount of time to receive an outcome from the time of execution, etc. The IT operations platform 102 then generates a prioritized list of executable actions and playbooks based on the statistical scores.

In some embodiments, the IT operations platform 102 generates a recommendation to perform one or more of the highest priority executable actions and/or playbooks (e.g., the executable action or playbook with the highest success rate). In some embodiments, the IT operations platform 102 automatically initiates performance of the one or more of the highest priority executable actions and/or playbooks without requiring user interaction.

The HUD panel 608 displays to a user information related to an incident or event. As illustrated in FIG. 6, the HUD panel 608 displays information indicating the most recent indicator of compromise (IOC), the IOC count, the affected users, and the affected IP addresses.

In some embodiments, the IT operations platform 102 assigns a severity level to an event or incident. For example, the IT operations platform 102 can designate an incident as having a low, medium, high, or custom severity level. In some embodiments, the IT operations platform 102 determines a severity level for an incident based on one or more of a plurality of factors, including, but not limited to, incident type, affected systems, history of incidents on the affected systems, etc. In some embodiments, the IT operations platform 102 enforces different service-level agreements (SLAs) that designate an amount of time to resolve the occurrence of the type of incident and/or an amount of time to resolve each particular phase and/or task associated with the type of incident. In such embodiments, the IT operations platform 102 sends a notification to a user designated or assigned to resolve the incident, phase, or task, to inform the user of the incident, and initiates a timer for the designated amount of time. In some embodiments, in response to an expiration of the timer prior to receiving a selection of an executable action or playbook from the set of suggested executable actions 606, the IT operations platform 102 designates another user to for resolve the incident, phase, or task.

Figure 7:
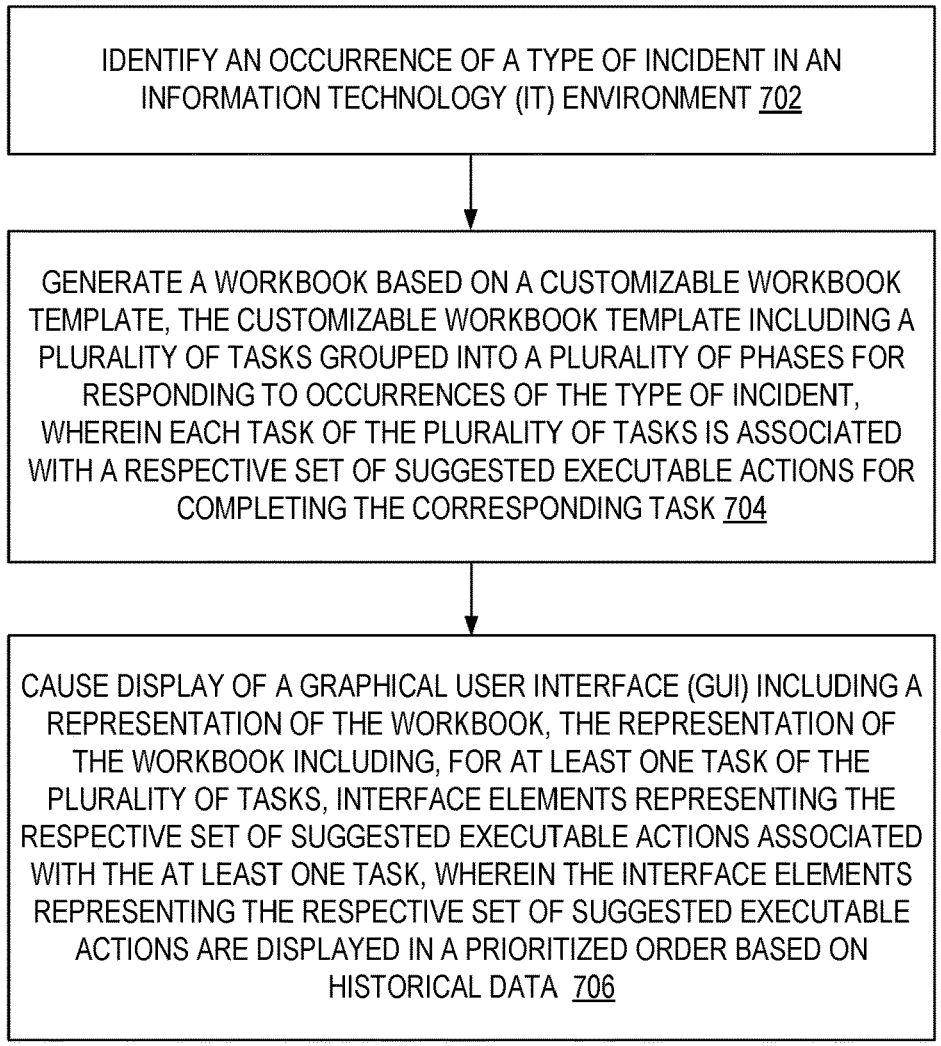
FIG. 7 is a flow diagram illustrating operations 700 of a method for graphically displaying a workbook interface including a set of ordered, suggested actions for performing a task in response to the occurrence of an incident according to some embodiments.

FIG. 7 is a flow diagram illustrating operations 700 of a method for graphically displaying a workbook interface including a set of ordered, suggested actions for performing a task in response to the occurrence of an incident according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by an IT operations platform 102 of the other figures.

The operations 700 include, at block 702, identifying an occurrence of a type of incident in an information technology (IT) environment.

The operations 700 further include, at block 704, in response to identifying the occurrence of the type of incident, generating a workbook based on a customizable workbook template, the customizable workbook template including a plurality of tasks grouped into a plurality of phases for responding to occurrences of the type of incident, wherein each task of the plurality of tasks is associated with a respective set of suggested executable actions for completing the corresponding task.

The operations 700 further include, at block 706, causing display of a graphical user interface (GUI) including a representation of the workbook, the representation of the workbook including, for at least one task of the plurality of tasks, interface elements representing the respective set of suggested executable actions associated with the at least one task, wherein the interface elements representing the respective set of suggested executable actions are displayed in a prioritized order based on historical data. In one embodiment, the historical data includes data indicating whether past executions of each suggested executable action were successful.

In some embodiments, the operations further include receiving, for a particular task of the plurality of tasks, a selection of a suggested executable action from the respective set of suggested executable actions associated with the particular task; executing, by the IT operations platform, the suggested executable action; and generating log data indicating whether the execution of the suggested executable action was successful.

In some embodiments, the respective set of suggested executable actions includes at least one user-specified executable action. In some embodiments, the respective set of suggested executable actions includes at least one automatically identified executable action (e.g., automatically identified by the IT operations platform 102 based on an analysis of the text describing the associated phase/task). For example, in some embodiments, the operations further include identifying a description of a particular task of the plurality of task; identifying at least one executable action from a plurality of executable actions, the at least one executable action correlated to the description of the particular task; and modifying the set of suggested executable actions for the particular task to include the at least one executable action as the at least one automatically identified action.

In some embodiments, the operations further include receiving, for a particular task of the plurality of tasks, a selection of an executable action not within the respective set of suggested executable actions associated with the particular task; executing, by the IT operations platform, the executable action; generating log data indicating whether the execution of the executable action was successful; and evaluating the log data to determine whether to include the executable action as an automatically identified action in the respective set of suggested executable actions associated with the particular task in the customizable workbook template.

In some embodiments, the workbook displays a subset of the set of suggested executable actions, and modifying the set of suggested executable actions for the particular task to include the at least one executable action as the at least one automatically identified action further includes removing a suggested executable action from the subset of the set of suggested executable actions.

In some embodiments, modifying the set of suggested executable actions for the particular task to include the at least one executable action as the at least one automatically identified action further includes: determining that the at least one executable action has been performed a predefined minimum number of times.

In some embodiments, modifying the set of suggested executable actions for the particular task to include the at least one executable action as the at least one automatically identified action further includes: sending a notification to an administrator regarding the addition of the at least one executable action to the set of suggested executable actions.

In some embodiments, modifying the set of suggested executable actions for the particular task to include the at least one executable action as the at least one automatically identified action further includes: sending a query to an administrator for approval of the addition of the at least one executable action to the set of suggested executable actions.

In some embodiments, identifying the occurrence of the type of incident in the IT environment comprises: receiving an input from a data intake and query system indicating the occurrence of the type of incident in the IT environment.

In some embodiments, the operations further include determining a designated amount of time to resolve the occurrence of the type of incident based on the severity level; sending a notification to a first user account associated with a particular task of the plurality of tasks, the particular task associated with the set of suggested executable actions; in response to sending the notification to the first user account, initiating a timer for the designated amount of time; and in response to an expiration of the timer prior to receiving the selection of the first executable action from the first user account, designating a second user account for performance of the particular task.

In some embodiments, the historical data includes characteristics of the previous performances of the executable actions in the set of suggested executable actions, and wherein the characteristics of the previous performances of the executable actions in the set of suggested executable actions include a result of the performance of each of the previous performances of the executable actions, the frequency of use of each of the executable actions, the recency of use of each of the executable actions, the average amount of time to receive an outcome from the time of performances of each of the executable actions. In some embodiments, the historical data includes information indicating whether past executions of each suggested executable action were successful.

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 8:
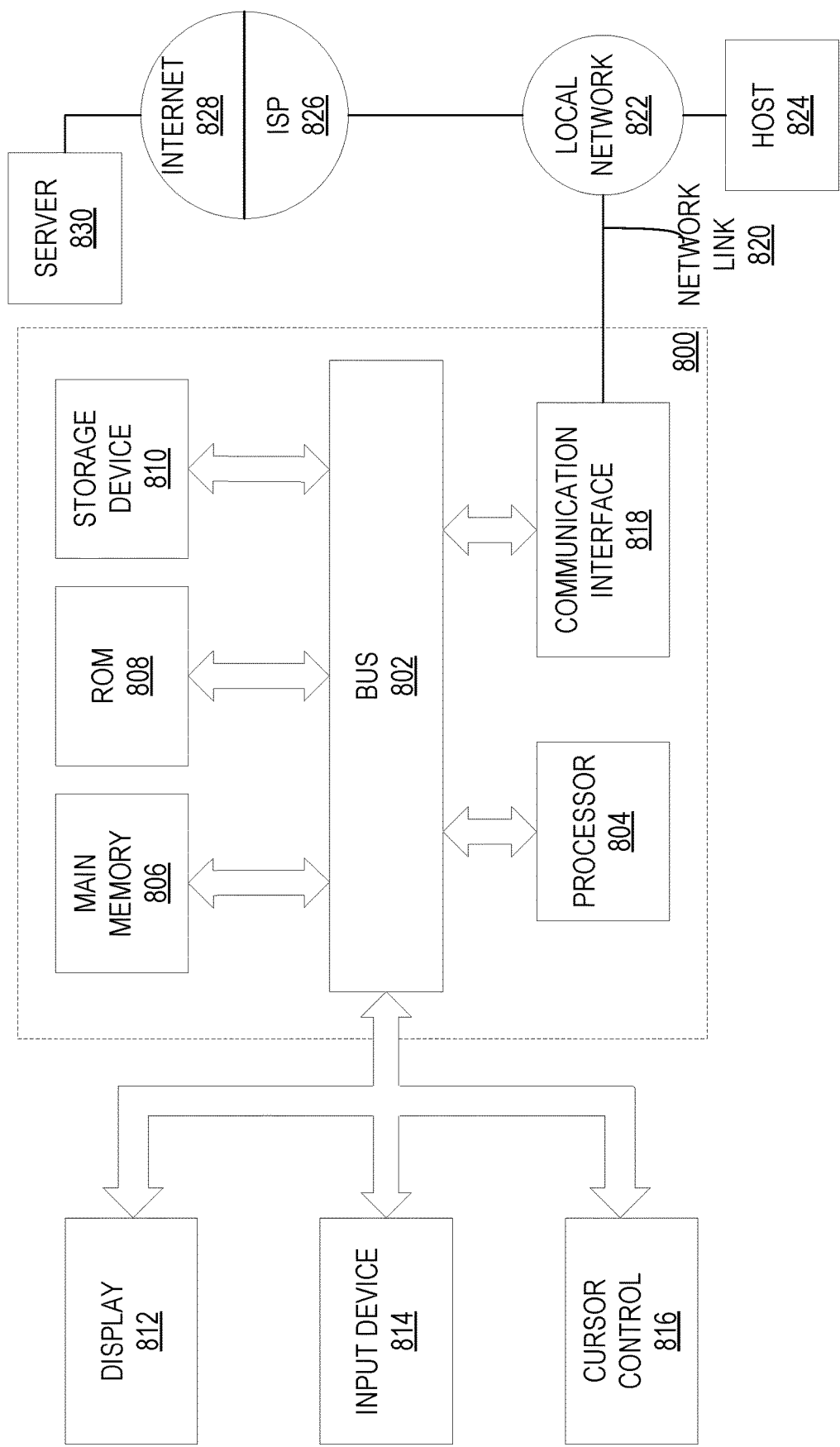
FIG. 8 is a block diagram illustrating a computer system utilized in implementing the techniques described herein according to some embodiments.

FIG. 8 is a block diagram that illustrates a computer system 800 utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device.

Computer system 800 includes one or more buses 802 or other communication mechanism for communicating information, and one or more hardware processors 804 coupled with buses 802 for processing information. Hardware processors 804 may be, for example, general purpose microprocessors. Buses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes a main memory 806, such as a random access memory (RAM) or other dynamic or volatile storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 a special-purpose machine that is customized to perform the operations specified in the instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, is provided and coupled to bus 802 for storing information and instructions.

Computer system 800 may be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

A computer system 800 may implement techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions.

The instructions received by main memory 806 may optionally be stored on storage device 810 either before or after execution by processor 804.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data, including program code and/or other types of instructions, through the network(s), network link 820, and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

In an embodiment, some or all of the systems described herein may be or comprise server computer systems, including one or more computer systems 800 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by an information technology (IT) operations platform, the method comprising:
   identifying an occurrence of a type of incident in an IT environment;
   in response to identifying the occurrence of the type of incident, generating a workbook from a customizable workbook template, the customizable workbook template including a plurality of tasks grouped into a plurality of phases for responding to occurrences of the type of incident, wherein each task of the plurality of tasks is associated with a respective set of suggested executable actions for completing a corresponding task, wherein a set of suggested executable actions for a task is automatically generated by:
      identifying a textual description of the task,
      identifying a subset of executable actions from a set of executable actions, wherein the subset of executable actions are correlated to the task based on the textual description of the task, and
      associating the subset of executable actions with the respective set of suggested executable actions for the task; and
   causing display of a graphical user interface (GUI) including a representation of the workbook, the representation of the workbook including, for at least one task of the plurality of tasks, interface elements representing the respective set of suggested executable actions associated with the at least one task, wherein the interface elements representing the respective set of suggested executable actions are displayed in a prioritized order based on historical data.

2. The computer-implemented method of claim 1, further comprising:
   receiving, for a particular task of the plurality of tasks, a selection of a suggested executable action from the respective set of suggested executable actions associated with the particular task;
   executing, by the IT operations platform, the suggested executable action; and
   generating log data indicating whether execution of the suggested executable action was successful.

3. The computer-implemented method of claim 2, further comprising:
   comparing the log data indicating whether execution of the suggested executable action was successful against log data for the set of suggested executable actions; and
   modifying an order of the suggested executable actions in the set of suggested executable actions based on the comparing.

4. The computer-implemented method of claim 1, wherein the respective set of suggested executable actions includes at least one user-specified executable action.

5. The computer-implemented method of claim 1, wherein the respective set of suggested executable actions includes at least one automatically identified executable action.

6. The computer-implemented method of claim 5, further comprising:
   receiving, for a particular task of the plurality of tasks, a selection of an executable action not within the respective set of suggested executable actions associated with the particular task;
   executing, by the IT operations platform, the executable action;

generating log data indicating whether execution of the executable action was successful; and evaluating the log data to determine whether to include the executable action as an automatically identified action in the respective set of suggested executable actions associated with the particular task in the customizable workbook template.

7. The computer-implemented method of claim 5, further comprising:

identifying a description of a particular task of the plurality of tasks;

identifying at least one executable action from a plurality of executable actions, the at least one executable action correlated to the description of the particular task; and modifying the set of suggested executable actions for the particular task to include the at least one executable action as the at least one automatically identified executable action.

8. The computer-implemented method of claim 7, wherein the workbook displays a subset of the set of suggested executable actions, and wherein modifying the set of suggested executable actions for the particular task to include the at least one executable action as the at least one automatically identified executable action further includes removing a suggested executable action from the subset of the set of suggested executable actions.

9. The computer-implemented method of claim 7, wherein modifying the set of suggested executable actions for the particular task to include the at least one executable action as the at least one automatically identified executable action further includes:

determining that the at least one executable action has been performed a predefined minimum number of times.

10. The computer-implemented method of claim 7, wherein modifying the set of suggested executable actions for the particular task to include the at least one executable action as the at least one automatically identified executable action further includes:

sending a notification to an administrator regarding addition of the at least one executable action to the set of suggested executable actions.

11. The computer-implemented method of claim 7, wherein modifying the set of suggested executable actions for the particular task to include the at least one executable action as the at least one automatically identified executable action further includes:

sending a query to an administrator for approval of addition of the at least one executable action to the set of suggested executable actions.

12. The computer-implemented method of claim 1, wherein identifying the occurrence of the type of incident in the IT environment comprises:

receiving an input from a data intake and query system indicating the occurrence of the type of incident in the IT environment.

13. The computer-implemented method of claim 1, wherein the type of incident is associated with a severity level.

14. The computer-implemented method of claim 13, further comprising:

determining a designated amount of time to resolve the occurrence of the type of incident based on the severity level;

sending a notification to a first user account associated with a particular task of the plurality of tasks, the particular task associated with the set of suggested executable actions;

in response to sending the notification to the first user account, initiating a timer for the designated amount of time; and in response to an expiration of the timer prior to receiving a selection of a first executable action from the first user account, designating a second user account for performance of the particular task.

15. The computer-implemented method of claim 1, wherein the historical data includes characteristics of previous performances of the executable actions in the set of suggested executable actions, and wherein the characteristics of the previous performances of the executable actions in the set of suggested executable actions include a result of performance of each of the previous performances of the executable actions, frequency of use of each of the executable actions, recency of use of each of the executable actions, an average amount of time to receive an outcome from times of performances of each of the executable actions.

16. The computer-implemented method of claim 1, wherein the historical data includes information indicating whether past executions of each suggested executable action were successful.

17. A non-transitory computer-readable storage medium storing instructions which, when executed by one or more processors, cause performance of operations comprising:

identifying an occurrence of a type of incident in an IT environment;

in response to identifying the occurrence of the type of incident, generating a workbook from a customizable workbook template, the customizable workbook template including a plurality of tasks grouped into a plurality of phases for responding to occurrences of the type of incident, wherein each task of the plurality of tasks is associated with a respective set of suggested executable actions for completing a corresponding task, wherein a set of suggested executable actions for a task is automatically generated by:

identifying a textual description of the task, identifying a subset of executable actions from a set of executable actions, wherein the subset of executable actions are correlated to the task based on the textual description of the task, and associating the subset of executable actions with the respective set of suggested executable actions for the task; and causing display of a graphical user interface (GUI) including a representation of the workbook, the representation of the workbook including, for at least one task of the plurality of tasks, interface elements representing the respective set of suggested executable actions associated with the at least one task, wherein the interface elements representing the respective set of suggested executable actions are displayed in a prioritized order based on historical data.

18. The non-transitory computer-readable storage medium of claim 17, wherein the respective set of suggested executable actions includes at least one user-specified executable action.

19. The non-transitory computer-readable storage medium of claim 17, wherein the respective set of suggested executable actions includes at least one automatically identified executable action.

20. The non-transitory computer-readable storage medium of claim 17, wherein the instructions, when executed by the one or more processors, further cause performance of operations comprising:
receiving, for a particular task of the plurality of tasks, a selection of an executable action not within the respective set of suggested executable actions associated with the particular task;
executing, by an IT operations platform, the executable action;
generating log data indicating whether execution of the executable action was successful; and
evaluating the log data to determine whether to include the executable action as an automatically identified action in the respective set of suggested executable actions associated with the particular task in the customizable workbook template.

21. The non-transitory computer-readable storage medium of claim 17, wherein the instructions, when executed by the one or more processors, further cause performance of operations comprising:
identifying a description of a particular task of the plurality of tasks;
identifying at least one executable action from a plurality of executable actions, the at least one executable action correlated to the description of the particular task; and
modifying the set of suggested executable actions for the particular task to include the at least one executable action as at least one automatically identified executable action.

22. The non-transitory computer-readable storage medium of claim 21, wherein the workbook displays a subset of the set of suggested executable actions, and wherein modifying the set of suggested executable actions for the particular task to include the at least one executable action as the at least one automatically identified executable action further includes removing a suggested executable action from the subset of the set of suggested executable actions.

23. The non-transitory computer-readable storage medium of claim 21, wherein modifying the set of suggested executable actions for the particular task to include the at least one executable action as the at least one automatically identified executable action further includes:
determining that the at least one executable action has been performed a predefined minimum number of times.

24. An apparatus, comprising:
one or more processors; and
a non-transitory computer-readable storage medium storing instructions which, when executed by the one or more processors, causes the apparatus to:
identify an occurrence of a type of incident in an IT environment;
in response to identifying the occurrence of the type of incident, generate a workbook based on a customizable workbook template, the customizable workbook template including a plurality of tasks grouped into a plurality of phases for responding to occurrences of the type of incident, wherein each task of the plurality of tasks is associated with a respective set of suggested executable actions for completing a corresponding task, wherein a set of suggested executable actions for a task is automatically generated by:
identifying a textual description of the task,
identifying a subset of executable actions from a set of executable actions, wherein the subset of executable actions are correlated to the task based on the textual description of the task, and
associating the subset of executable actions with the respective set of suggested executable actions for the task; and
cause display of a graphical user interface (GUI) including a representation of the workbook, the representation of the workbook including, for at least one task of the plurality of tasks, interface elements representing the respective set of suggested executable actions associated with the at least one task, wherein the interface elements representing the respective set of suggested executable actions are displayed in a prioritized order based on historical data.

25. The apparatus of claim 24, wherein the respective set of suggested executable actions includes at least one user-specified executable action.

26. The apparatus of claim 24, wherein the respective set of suggested executable actions includes at least one automatically identified executable action.

27. The apparatus of claim 24, wherein the instructions, when executed by the one or more processors, further cause the apparatus to:
receive, for a particular task of the plurality of tasks, a selection of an executable action not within the respective set of suggested executable actions associated with the particular task;
execute, by an IT operations platform, the executable action;
generate log data indicating whether execution of the executable action was successful; and
evaluate the log data to determine whether to include the executable action as an automatically identified action in the respective set of suggested executable actions associated with the particular task in the customizable workbook template.

28. The apparatus of claim 24, wherein the instructions, when executed by the one or more processors, further cause the apparatus to:
identifying a description of a particular task of the plurality of task;
identifying at least one executable action from a plurality of executable actions, the at least one executable action correlated to the description of the particular task; and
modifying the set of suggested executable actions for the particular task to include the at least one executable action as at least one automatically identified executable action.

29. The apparatus of claim 28, wherein the workbook displays a subset of the set of suggested executable actions, and wherein modifying the set of suggested executable actions for the particular task to include the at least one executable action as the at least one automatically identified executable action further includes removing a suggested executable action from the subset of the set of suggested executable actions.

30. The apparatus of claim 28, wherein modifying the set of suggested executable actions for the particular task to include the at least one executable action as the at least one automatically identified executable action further includes:
determining that the at least one executable action has been performed a predefined minimum number of times.

* * * * *